United States Patent
Schoenfelder

(10) Patent No.: US 10,894,383 B2
(45) Date of Patent: *Jan. 19, 2021

(54) TEXTILE COMPOSITE MATERIAL FOR LAMINATION OF A SEAT COVER, COMPRISING A NONWOVEN FABRIC COMPONENT AND A FOAM MATERIAL COMPONENT

(71) Applicant: J.H. Ziegler GmbH, Achern (DE)

(72) Inventor: Steffi Schoenfelder, Sasbach (DE)

(73) Assignee: J.H. Ziegler GmbH, Achern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/525,332

(22) PCT Filed: Oct. 23, 2015

(86) PCT No.: PCT/EP2015/074617
§ 371 (c)(1),
(2) Date: May 9, 2017

(87) PCT Pub. No.: WO2016/074906
PCT Pub. Date: May 19, 2016

(65) Prior Publication Data
US 2018/0050514 A1    Feb. 22, 2018

(30) Foreign Application Priority Data
Nov. 10, 2014 (DE) .................. 10 2014 116 354

(51) Int. Cl.
B32B 5/24 (2006.01)
B32B 5/02 (2006.01)
(Continued)

(52) U.S. Cl.
CPC .............. *B32B 5/245* (2013.01); *B32B 5/022* (2013.01); *B32B 5/06* (2013.01); *B32B 5/08* (2013.01);
(Continued)

(58) Field of Classification Search
CPC .. B60N 2/58; A47C 7/24; B32B 5/022; B32B 5/018; B32B 5/245; B32B 7/12; B32B 2601/00
(Continued)

(56) References Cited

U.S. PATENT DOCUMENTS 3,352,739 A * 11/1967 Blue ....................... B29C 66/00
442/372
3,451,885 A * 6/1969 Klein ..................... B32B 5/022
442/225
(Continued)

FOREIGN PATENT DOCUMENTS

DE    1 294 916 U    5/1969
DE    1 619 249 A    10/1970
(Continued)

OTHER PUBLICATIONS

Search Report dated Jul. 14, 2015 issued in corresponding DE patent application No. 10 2014 116 354.0 (and partial English translation).
(Continued)

*Primary Examiner* — Jennifer A Gillett
(74) *Attorney, Agent, or Firm* — Posz Law Group, PLC

(57) ABSTRACT

A textile composite material for lamination, in particular a textile composite material for lamination of a seat cover, with at least one nonwoven fabric component and with at least one foam material component which is connected to the nonwoven fabric component, wherein the nonwoven fabric component and the foam material component are
(Continued)

Figure 1:
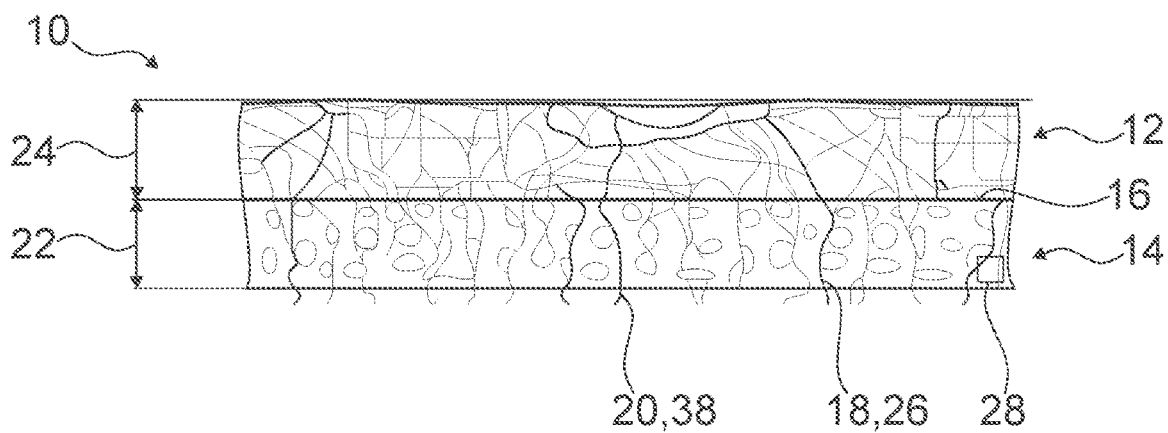

mechanically connected to each other. The nonwoven fabric component and the foam material component may be needled with each other, wherein a holding force between the nonwoven fabric component and the foam material component, which acts counter to a foam-nonwoven separating force, is greater than 1 N.

14 Claims, 1 Drawing Sheet

(51) Int. Cl.

| | | |
|---|---|---|
| B60N 2/58 | (2006.01) | |
| D04H 1/498 | (2012.01) | |
| B32B 5/06 | (2006.01) | |
| B32B 5/08 | (2006.01) | |
| B32B 5/18 | (2006.01) | |
| B32B 27/40 | (2006.01) | |
| D04H 3/10 | (2012.01) | |
| B32B 37/12 | (2006.01) | |

(52) U.S. Cl.
CPC ............... *B32B 5/18* (2013.01); *B32B 27/40* (2013.01); *B32B 37/12* (2013.01); *B60N 2/5891* (2013.01); *D04H 1/498* (2013.01); *D04H 3/102* (2013.01); *B32B 2262/0223* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/14* (2013.01); *B32B 2266/0214* (2013.01); *B32B 2266/0264* (2013.01); *B32B 2266/0278* (2013.01); *B32B 2305/022* (2013.01); *B32B 2305/20* (2013.01); *B32B 2307/51* (2013.01); *B32B 2307/724* (2013.01); *B32B 2375/00* (2013.01); *B32B 2601/00* (2013.01); *B32B 2605/003* (2013.01)

(58) Field of Classification Search
USPC ............................ 442/370, 338; 297/452, 48
See application file for complete search history.

(56) References Cited

U.S. PATENT DOCUMENTS

| | | | | | |
|---|---|---|---|---|---|
| 3,506,529 | A | * | 4/1970 | Sanders ................ | D04H 1/498 428/92 |
| 3,532,588 | A | * | 10/1970 | Newman ................ | B32B 5/18 428/221 |
| 4,426,414 | A | * | 1/1984 | Wilkerson ............ | A47G 9/0207 428/102 |
| 4,520,066 | A | * | 5/1985 | Athey .................... | B68G 11/03 442/338 |
| 5,298,321 | A | * | 3/1994 | Isoda ..................... | D02G 1/14 428/362 |
| 5,646,077 | A | * | 7/1997 | Matsunaga ............ | D01F 6/62 428/326 |
| 5,882,794 | A | * | 3/1999 | Hernandez ............ | D02G 3/00 428/376 |
| 5,974,150 | A | * | 10/1999 | Kaish ................... | G06K 19/086 283/85 |
| 6,083,857 | A | * | 7/2000 | Bottger ................ | A47C 21/046 442/370 |
| 6,102,482 | A | * | 8/2000 | Dettoni .................... | A47C 7/16 297/440.11 |
| 6,394,542 | B2 | * | 5/2002 | Potisch ................... | A47C 7/40 297/182 |
| 2003/0032358 | A1 | * | 2/2003 | Yamaguchi .......... | B01D 39/163 442/370 |
| 2004/0103970 | A1 | | 6/2004 | Quederni et al. | |
| 2004/0256175 | A1 | | 12/2004 | Gnadig | |
| 2008/0008862 | A1 | * | 1/2008 | Ogle ................... | A47G 27/0468 428/159 |
| 2008/0070465 | A1 | * | 3/2008 | Wiles ...................... | B32B 5/26 442/352 |
| 2009/0247037 | A1 | | 10/2009 | Kanda et al. | |
| 2010/0009112 | A1 | | 1/2010 | Baychar | |
| 2013/0157551 | A1 | * | 6/2013 | Endo ..................... | B24D 11/00 451/532 |
| 2014/0273705 | A1 | | 9/2014 | Lawrence et al. | |

FOREIGN PATENT DOCUMENTS

| | | |
|---|---|---|
| DE | 80 03 911 U1 | 7/1980 |
| DE | 33 35 669 A1 | 5/1985 |
| DE | 199 56 319 A1 | 6/2001 |
| DE | 100 19 370 C2 | 10/2001 |
| DE | 202 13 228 U1 | 12/2002 |
| DE | 697 18 572 T2 | 11/2003 |
| DE | 10 2004 051 929 A1 | 4/2006 |
| DE | 20 2009 015 059 U1 | 1/2010 |
| DE | 10 2010 047 105 A1 | 4/2012 |
| EP | 1 018 702 A1 | 7/2000 |
| EP | 1 039 005 A1 | 9/2000 |
| GB | 1007632 A | 10/1965 |
| GB | 1183616 A | 3/1970 |
| WO | 97/18157 A2 | 5/1997 |
| WO | 2014/150336 A2 | 9/2014 |

OTHER PUBLICATIONS

International Search Report of the International Searching Authority dated Jan. 19, 2016 issued in corresponding International Patent Application No. PCT/EP2015/074617.

International Preliminary Report on Patentability dated May 11, 2017 issued in corresponding International Patent Application No. PCT/EP2015/074617 (and German version of Nov. 29, 2016 with Article 34 amendments).

Office action dated Feb. 26, 2019 issued in corresponding CN patent application No. 201580072543.7 (and English translation thereof).

* cited by examiner

TEXTILE COMPOSITE MATERIAL FOR LAMINATION OF A SEAT COVER, COMPRISING A NONWOVEN FABRIC COMPONENT AND A FOAM MATERIAL COMPONENT

CROSS REFERENCE TO RELATED APPLICATIONS

This application is a U.S. national stage application of PCT/EP2015/074617 filed on Oct. 23, 2015, which claims priority to German Patent Application No. DE 10 2014 116 354.0 filed on Nov. 10, 2014, the contents of which are incorporated herein by reference.

PRIOR ART

The invention relates to a textile composite material for lamination of a seat cover according to the preamble of claim 1.

Textile composite materials for lamination, comprising at least one nonwoven fabric component and at least one foam material component which are connected to each other, are already known. Herein the nonwoven fabric component and the foam material component are in the already known textile composite materials for lamination connected to each other via an adhesive-bonding procedure.

Moreover, DE 20 2009 015 059 U1, WO 97/18 157 A2, DE 80 03 911 U1 and DE 1 294 916 A respectively teach a textile composite material for lamination comprising at least one nonwoven fabric component and at least one foam material component, wherein the foam material component is connected to the nonwoven fabric component, wherein the nonwoven fabric component and the foam material component are mechanically connected to each other.

Furthermore, from WO 2014/150336 A2 a composite material is already known, comprising a nonwoven fabric component with a thickness of 2.5 mm, wherein the nonwoven fabric component comprises a first fiber of polyacrylonitrile and a second fiber of polyetherimide, wherein the first fiber and the second fiber respectively have a linear mass density value of 1-4 denier. The composite material further comprises a foam layer with a thickness of 2.5 mm and a density of at least 0.1 g per $cm^3$. The nonwoven fabric component and the foam layer are needled with each other, wherein, in a needling process, a needle enters into the nonwoven fabric component and into the foam layer 1.55 times per $cm^2$.

From EP 1 039 005 A1 a synthetic leather for shoes is already known, comprising a nonwoven fabric component containing 30-95 percent by weight of hollow fibers and 5-70 percent by weight of non-hollow fibers as well as a porous cover layer.

From US 2004/103970 A1 a nonwoven fabric is already known, comprising hollow fibers with a linear mass density value of 2-18 denier made of polyethylene terephthalate (PET) and bicomponent fibers with a linear mass density value of 2-6 denier.

The objective of the invention is in particular to make a generic textile composite material for lamination of a seat cover, in particular a counterfeit-protected textile composite material for lamination of a seat cover, available which features a fixed connection between the nonwoven fabric component and the foam material component while maintaining an advantageous drapability of the textile composite material for lamination of a seat cover, in particular an arrangeability of the textile composite material for lamination of a seat cover in at least substantially fold-free arrangement. The objective is achieved according to the invention by the features of claim 1 while advantageous implementations and further developments of the invention may be gathered from the subclaims.

Advantages of the Invention

The invention is based on a textile composite material for lamination of a seat cover, with at least one nonwoven fabric component and with at least one foam material component which is connected to the nonwoven fabric component, wherein the nonwoven fabric component and the foam material component are mechanically connected to each other, wherein the nonwoven fabric component and the foam material component are needled with each other, wherein the nonwoven fabric component comprises at least one functional fiber.

It is proposed that a holding force between the nonwoven fabric component and the foam material component, which acts counter to a foam-nonwoven separating force, is greater than 1 N, in particular due to a form-fit and/or force-fit connection between the fibers of the nonwoven fabric component and the foam material component, wherein the foam material component has a maximum foam material thickness which is equivalent to a value of a value range from 1 mm to 6 mm, wherein the foam material component is embodied as a polyurethane-polyether foam or as a polyurethane-polyester foam, wherein the functional fiber has a linear mass density value which is equivalent to a value between 1.5 dtex and 24 dtex, and wherein the binder fiber has a linear mass density value equivalent to a value between 1 dtex and 9 dtex. By "mechanically connected to each other" is here in particular a form-fit and/or force-fit connection between at least two elements to be understood, in particular a form-fit and/or force-fit connection between the nonwoven fabric component and the foam material component. Preferably the nonwoven fabric component and the foam material component are mechanically connected to each other without a substance-to-substance bond. Especially preferentially herein fibers of the nonwoven fabric component engage into the foam material component. Preferably the textile composite material for lamination of a seat cover is configured to at least partly implement a seat cover, in particular a motor vehicle seat cover. "Configured" is in particular to mean specifically designed and/or specifically equipped. By an element and/or a unit being configured for a certain function is in particular to be understood that the element and/or the unit fulfill/fulfills and/or implement/implements said certain function in at least one application state and/or operating state, or that the element and/or the unit are/is specifically designed for fulfilling said certain function.

The nonwoven fabric component preferably comprises at least one binder fiber (melt fiber) and at least one functional fiber. The binder fiber herein in particular has a linear mass density value which is greater than 1 dtex, is preferably greater than 5 dtex and is particularly preferably smaller than 15 dtex. Very particularly preferably the binder fiber has a linear mass density value which is equivalent to a value between 1 dtex and 9 dtex. Preferentially the binder fiber has a melting temperature equivalent to a value of a value range from 100° C. to 190° C. Especially preferentially the binder fiber has a melting temperature equivalent to a value of a value range from 130° C. to 160° C.

The functional fiber is preferably embodied as a polyester fiber, in particular as a polyethylene terephthalate fiber. It is however also conceivable that the functional fiber features another implementation deemed expedient by someone having ordinary skill in the art, e.g. an implementation as a polyamide fiber, as a polyolefin fiber, as a polyacrylonitrile fiber, as a polyvinyl chloride fiber, as a polyvinyl alcohol fiber, as a polyvinylidene fiber, as a polytetrafluoroethylene fiber, as a polyurethane fiber, or the like. The functional fiber has in particular a linear mass density value which is greater than 1 dtex, is preferably greater than 15 dtex and is particularly preferably smaller than 30 dtex. Especially preferentially the functional fiber has a linear mass density value which is equivalent to a value between 1.5 dtex and 24 dtex. Preferably the functional fiber has a great resiliency capability. For this purpose the functional fiber is preferably embodied in a spirally crimped fashion. Particularly preferably the nonwoven fabric component features a plurality of binder fibers and a plurality of functional fibers, which are mixed up with each other. Herein the binder fibers and/or the functional fibers may be embodied as spinning fibers (staple fibers) or as filaments (continuous fibers). Due to mix-up, the binder fibers and/or the functional fibers of the nonwoven fabric component are preferably interconnected by means of a form-fit connection (by interlacing), by cohesion and/or by adhesion. Herein, for implementing the nonwoven fabric component, the binder fibers and/or the functional fibers may be arranged in an oriented or in a tangled manner. The nonwoven fabric component in particular comprises a basis weight which is greater than 30 g per m$^2$, is preferably greater than 60 g per m$^2$ and is especially preferentially smaller than 550 g per m$^2$. Very particularly preferably the nonwoven fabric component has a basis weight which is equivalent to a value of a value range from 50 g per m$^2$ to 500 g per m$^2$.

The foam material component is preferably embodied as a polyurethane-polyether foam or as a polyurethane-polyester foam, in particular as a polyurethane-polyether cut foam or as a polyurethane-polyester cut foam. It is however also conceivable that the foam material component has a different implementation which is deemed expedient by someone skilled in the art, in particular a different implementation, deemed expedient by someone skilled in the art, as a foam with a textile character which is soft-elastic, which is rollable and which features high resiliency forces as well as a preferably high air permeability (e.g. reticulated foams). In particular, the foam material component has a maximum foam material thickness which is smaller than 10 mm, preferably smaller than 8 mm and particularly preferably greater than 0.9 mm. Very especially preferably the foam material component features a maximum foam material thickness which is equivalent to a value of a value range from 1 mm to 6 mm.

By a "foam-nonwoven separating force" is here in particular a force to be understood acting onto the textile composite material for lamination of a seat cover in at least one case of a load, which is capable of inducing a connection between the nonwoven fabric component and the foam material component to be separated, in particular viewed along a direction extending at least substantially perpendicularly to the connecting surface of the foam material component. In particular, a holding force between the nonwoven fabric component and the foam material component acting counter to a foam-nonwoven separating force is smaller than 1 kN, preferably smaller than 0.8 kN and especially preferentially greater than 10 N. A holding force between the nonwoven fabric component and the foam material component acting counter to a foam-nonwoven separating force herein preferably results from an engagement of the fibers of the nonwoven fabric component in the foam material component, in particular from a form-fit and/or force-fit connection between the fibers of the nonwoven fabric component and the foam material component. The implementation according to the invention advantageously allows counteracting or at least substantially preventing an undesired separation of the nonwoven fabric component and the foam material component. Advantageously a textile composite material for lamination of a seat cover may be rendered available featuring a fixed connection between the nonwoven fabric component and the foam material component while maintaining an advantageous drapability of the textile composite material for lamination of a seat cover, in particular an arrangeability of the textile composite material for lamination of a seat cover in an at least substantially fold-free fashion. Furthermore an additional adhesive means for connecting the nonwoven fabric component and the foam material component may advantageously be dispensed with. This advantageously allows rendering available a textile composite material for lamination of a seat cover having favorable processing characteristics. The textile composite material for lamination of a seat cover is advantageously able to adapt to any movement/bulge/bend (convex or concave) of a surface of an object, in particular of a seat on which the textile composite material for lamination of a seat cover is arrangeable.

It is also proposed that the nonwoven fabric component and the foam material component are needled with each other, wherein at least more than 5% of a total connecting surface of the foam material component are pierced by fibers of the nonwoven fabric component.

The term "needled" is here in particular to define a mechanical connection between the nonwoven fabric component and the foam material component in which, in a state when the nonwoven fabric component is connected to the foam material component, at least one fiber, in particular a plurality of fibers of the nonwoven fabric component extends/extend at least partly into the foam material component. By a "connecting surface of the foam material component" is here in particular a total surface of the foam material component to be understood which is, in a state when connected to the nonwoven fabric component, adjacent to the nonwoven fabric component, in particular to a surface of the foam material component projected into a projection plane. Preferably the nonwoven fabric component and the foam material component are connected to each other via a needling process. Fibers of the nonwoven fabric component are thus preferably needled into the foam material component. Preferably fibers of the nonwoven fabric component extend into the foam material connecting surface over at least 5% of the total connecting surface of the foam material component, in particular distributed over the total connecting surface, along a direction extending at least substantially transversely to the connecting surface of the foam material component. By "at least substantially transversely" is here in particular an orientation of a direction and/or of an axis with respect to a reference direction and/or to a reference axis to be understood, wherein the orientation of the direction and/or of the axis is at least different from an at least substantially parallel orientation with respect to the reference direction and/or to the reference axis, and is in particular askew or perpendicular to the reference direction and/or to the reference axis. The implementation according to the invention allows a particularly advantageous and reliable connection between the nonwoven fabric component and the foam material component. Advantageously a high degree of stability of the foam material component can be maintained. This advantageously allows maintaining an elasticity and a durability of the foam material component. Moreover, a surface tension of the foam material component may advantageously be broken by a needle entering and/or penetrating during a needling process, for the purpose of allowing an advantageous adaptability of the textile composite material for lamination of a seat cover, in particular of the foam material component, to a shape of an object on which the textile composite material for lamination of a seat cover is arrangeable.

Especially advantageously it is proposed that the nonwoven fabric component and the foam material component are needled with each other, wherein at least more than 15% of the total connecting surface of the foam material component are pierced by fibers of the nonwoven fabric component. Preferentially fibers of the nonwoven fabric component extend into the foam material component over at least 15% of the connecting surface of the foam material component, in particular distributed over the total connecting surface, along a direction extending at least substantially transversely to the connecting surface of the foam material component. Preferably the fibers piercing the connecting surface of the foam material component are arranged in such a way that they are distributed on the connecting surface of the foam material component at least substantially homogeneously. The implementation according to the invention advantageously allows implementing a particularly secure connection between the nonwoven fabric component and the foam material component, which is advantageously resistant against an impact of separating forces. In addition, setting back of the textile composite material for lamination of a seat cover may advantageously be effected on a further material which is embodied as a leather cutting, advantageously allowing a flat seam at intersection points of several leather cuttings on an object, in particular on a seat which the textile composite material for lamination of a seat cover is arrangeable on together with the leather cutting.

It is further proposed that the nonwoven fabric component and the foam material component are needled with each other, wherein per 1 cm² of the connecting surface of the foam material component at least two fibers of the nonwoven fabric component enter into the foam material component. In particular, per 1 cm² of the connecting surface of the foam material component at least three fibers of the nonwoven fabric component, preferably at least five fibers of the nonwoven fabric component and especially preferentially at least ten fibers of the nonwoven fabric component enter the foam material component. Very particularly preferably per 1 cm² of the connecting surface of the foam material component more than ten fibers, in particular at least 20 to 300 fibers, of the nonwoven fabric component enter into the foam material component. Here the term "enter into the foam material component" means in particular an arrangement of fibers of the nonwoven fabric component with respect to the foam material component, wherein, in a connected state of the nonwoven fabric component and the foam material component, the fibers of the nonwoven fabric component extend into the foam material component. By means of the implementation according to the invention, a secure anchoring of the nonwoven fabric component on the foam material component is achievable.

Beyond this it is proposed that the nonwoven fabric component and the foam material component are needled with each other, wherein at least a large portion of fibers of the nonwoven fabric component entering into the foam material component extend into the foam material component at least by up to 50% of a maximum foam material thickness of the foam material component. A "large portion of fibers entering into the foam material component" is here in particular to mean at least more than 20%, preferably more than 30% and especially preferentially more than 50% of a total number of fibers of the nonwoven fabric component entering into the foam material component. It is however also conceivable that single fibers of the nonwoven fabric component extend into the foam material component farther than 50% of the maximum foam material thickness of the foam material component, or completely penetrate the foam material component. The term "extend into the foam material component at least by 50% of a maximum foam material thickness of the foam material component" is here in particular to mean that, starting from an edge region of the nonwoven fabric component, the fibers of the nonwoven fabric component have a protruding extension, in particular into the foam material component, which is equivalent to at least 50% of a maximum foam material thickness of the foam material component. The implementation according to the invention advantageously allows realizing a particularly firm connection between the nonwoven fabric component and the foam material component.

It is moreover proposed that a proportion of a maximum foam material thickness of the foam material component to a maximum nonwoven fabric thickness of the nonwoven fabric component is at least greater than or equal to 1. A "maximum nonwoven fabric thickness of the nonwoven fabric component" is here in particular to mean a maximum extension of the nonwoven fabric component, viewed along a direction running at least substantially perpendicularly to a main extension surface of the nonwoven fabric component, in particular at least substantially perpendicularly to the connecting surface of the foam material component, which maximum extension is implemented in particular by at least 70%, preferably by at least 80% and especially preferentially by at least 90% of a total number of interconnected fibers of the nonwoven fabric component, wherein in particular an entirety of the interconnected fibers, viewed in a cross section, form a polygonal shape, e.g. a rectangle, a square, or the like. Herein in particular single fibers extending beyond the polygonal shape will not be considered for determining the maximum nonwoven fabric thickness of the nonwoven fabric component. The term "substantially perpendicularly" is here in particular to define an orientation of a direction with respect to a reference direction, wherein the direction and the reference direction, in particular when viewed in a plane, include a 90-degree angle and the angle has a maximum deviation of in particular less than 8°, advantageously less than 5° and especially advantageously less than 2°. The implementation according to the invention advantageously allows for comfortable cushioning. Thus, with the exception of a foam core for a seat cushioning, additional under-sewed or glued cushioning materials may be advantageously dispensed with.

Very particularly preferably the functional fiber has a linear mass density value which is equivalent to a value of a value range from 1.5 dtex to 24 dtex. The implementation according to the invention advantageously allows realizing an open-pore nonwoven fabric component. Thus advantageously a breathable nonwoven fabric component is realizable.

It is also proposed that the functional fiber is embodied as a hollow fiber. Preferably the nonwoven fabric component comprises at least a portion of functional fibers which are embodied as hollow fibers and a portion of functional fibers which are not embodied as hollow fibers. The term "hollow fiber" is here in particular intended to define a fiber comprising at least one hollow space, in particular a fiber comprising at least one hollow space at least substantially extending along a total length of the fiber which, viewed along at least one circumferential direction extending around the longitudinal axis of the fiber, is encompassed by at least one envelope of the fiber. The envelope of the fiber may herein encompass the hollow space in particular in an annulus-shaped, trilobal or polygonal or similar manner. Herein the functional fiber embodied as a hollow fiber preferably has a hollow-space portion of in particular at least more than 1%, preferably at least more than 5% and especially preferentially more than 8%, with respect to a total volume portion of the hollow fiber. Very particularly preferably the functional fiber which is embodied as a hollow fiber has a hollow-space portion of less than 15%, in particular in a 10-percent range, with respect to a total volume portion of the hollow fiber. The implementation according to the invention particularly preferably allows realizing a nonwoven fabric component with a spirally crimped fiber.

Moreover it is proposed that the foam material component has a volumetric weight which is greater than 10 kg per $m^3$. Preferably the foam material component has a volumetric weight which is greater than 15 kg per $m^3$ and is particularly preferably smaller than 100 kg per $m^3$. Very especially preferentially the foam material component has a volumetric weight which is equivalent to a value of a value range from 20 kg per $m^3$ to 90 kg per $m^3$. By means of the implementation according to the invention, advantageously a textile composite material for lamination may be rendered available featuring advantageous cushioning characteristics.

It is further proposed that the textile composite material for lamination of a seat cover comprises at least one counterfeit protection unit. In this way a high degree of safety from counterfeiting of the textile composite material for lamination of a seat cover is advantageously achievable.

Beyond this it is proposed that the counterfeit protection unit is connected to the nonwoven fabric component and/or to the foam material component at least substantially non-releasably. "At least substantially non-releasably" is herein in particular to mean a connection of at least two element which are only separable from each other by means of separating tools, e.g. a saw, in particular a mechanical saw, etc. and/or by chemical separating means, e.g. solving agents etc. The implementation according to the invention advantageously allows ensuring that the counterfeit protection unit is not removed from the textile composite material for lamination of a seat cover unless desired.

It is also proposed that the counterfeit protection unit is embodied as an electronical counterfeit protection unit. It is herein conceivable that the counterfeit protection unit comprises at least one counterfeit protection element, which is connected to the nonwoven fabric component and/or to the foam material component in an at least substantially non-releasable fashion, and can be read out via a reading-out device of the counterfeit protection unit. The counterfeit protection element could herein be embodied as an RFID chip or such like. Further embodiments of the electronic counterfeit protection unit, which are deemed expedient by someone having ordinary skill in the art, are also conceivable, e.g. an implementation as a barcode counterfeit protection unit, or such like. By means of the implementation according to the invention, it is advantageously possible to implement a counterfeit protection unit which is difficult to be circumvented.

Furthermore it is proposed that the counterfeit protection unit is, alternatively or additionally, embodied as a mechanical counterfeit protection unit. It is herein conceivable that, for example, a counterfeit protection element of the counterfeit protection unit, which is embodied as a differently-colored fiber, is incorporated into the nonwoven fabric component or that, for example, a counterfeit protection element of the counterfeit protection unit, which is embodied as a fiber glowing under UV light, is incorporated into the nonwoven fabric component. Further implementations, which are deemed expedient by someone having ordinary skill in the art, are also conceivable. The implementation according to the invention advantageously allows realizing a structurally simple counterfeit protection unit.

Moreover a seat cover is proposed, which is embodied at least partly of the textile composite material for lamination.

The textile composite material for lamination of a seat cover according to the invention and/or the seat cover according to the invention are/is herein not to be restricted to the application and implementation form described above. In particular, for the purpose of fulfilling a functionality herein described, the textile composite material for lamination of a seat cover according to the invention and/or the seat cover according to the invention may comprise a number of respective elements, structural components and units as well as method steps which differs from a number herein mentioned. Furthermore, in regard to the value ranges indicated in the present disclosure, values within the limits mentioned are to be considered to be disclosed and to be applicable according to requirement.

DRAWINGS

Further advantages may become apparent from the following description of the drawings. In the drawings an exemplary embodiment of the invention is shown. The drawings, the description and the claims contain a plurality of features in combination. Someone skilled in the art will purposefully also consider the features separately and will find further expedient combinations.

Figure 2:
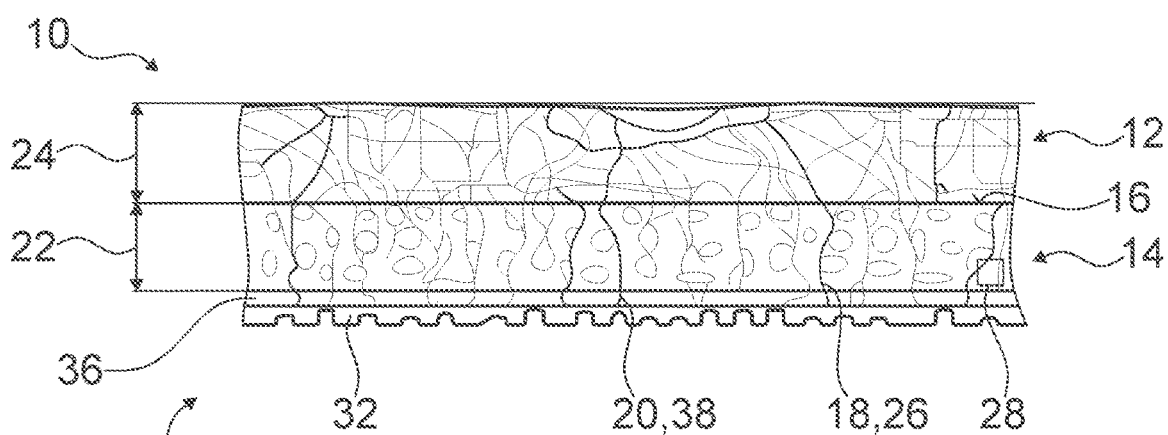
Figure 3:
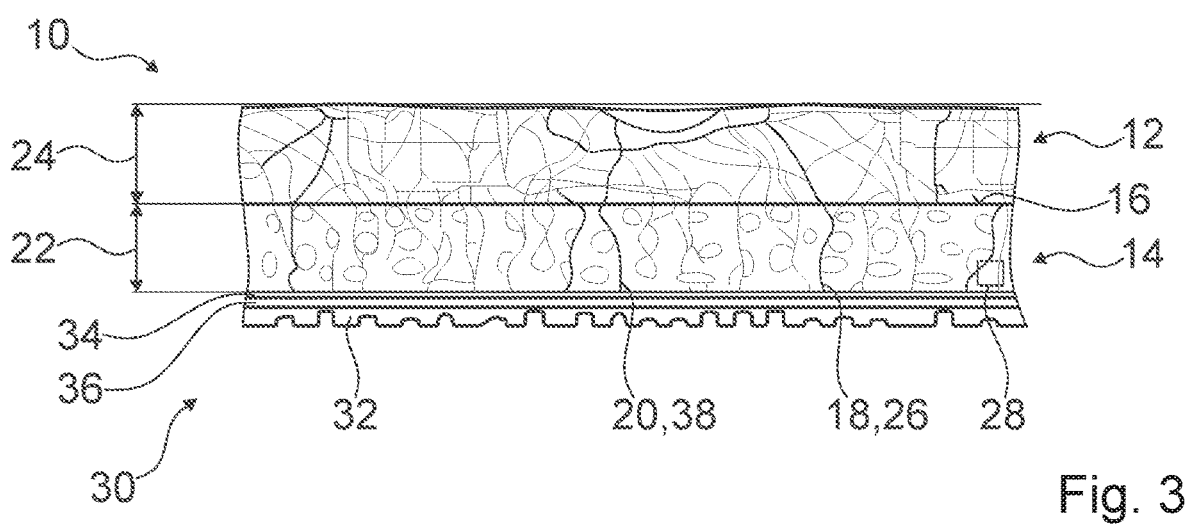

It is shown in:

FIG. 1 a sectional view of a textile composite material for lamination of a seat cover according to the invention, in a schematic presentation, FIG. 2 a sectional view of a textile composite material for lamination of a seat cover according to the invention, with a leather of a seat cover according to the invention, which is arranged on the textile composite material for lamination of a seat cover according to the invention, in a schematic presentation, and FIG. 3 a sectional view of a textile composite material for lamination of a seat cover according to the invention, with a leather arranged on the textile composite material for lamination of a seat cover according to the invention and with a leather-reinforcement of a seat cover according to the invention, which is arranged at the leather, in a schematic presentation

DESCRIPTION OF THE EXEMPLARY EMBODIMENT

FIG. 1 shows a textile composite material for lamination of a seat cover 10 with at least one nonwoven fabric component 12 and with at least one foam material component 14 which is connected to the nonwoven fabric component 12. Herein the nonwoven fabric component 12 and the foam material component 14 are connected to each other mechanically. The nonwoven fabric component 12 and the foam material component 14 are needled with each other, wherein at least more than 5% of a total connecting surface 16 of the foam material component 14 are pierced by fibers 18, 20 of the nonwoven fabric component 12. Preferably the nonwoven fabric component 12 and the foam material component 14 are needled with each other in such a way that at least more than 15% of the total connecting surface 16 of the foam material component 14 are pierced by fibers 18, 20 of the nonwoven fabric component 12. In this way, per 1 cm² of the connecting surface 16 of the foam material component 14 at least two fibers 18, 20 of the nonwoven fabric component 12 enter into the foam material component 14. Preferably per 1 cm² of the connecting surface 16 of the foam material component 14 at least ten fibers 18, 20, in particular between 20 and 300 fibers 18, 20, of the nonwoven fabric component 12 enter into the foam material component 14. It is however also conceivable that per 1 cm² of the connecting surface 16 of the foam material component 14 more than ten, in particular more than 300 fibers 18, 20 of the nonwoven fabric component 12 enter into the foam material component 14.

Furthermore, at least a large portion of the fibers 18, 20 of the nonwoven fabric component 12 entering into the foam material component 14 extend into the foam material component 14 at least by up to 50% of a maximum foam material thickness 22 of the foam material component 14. It is however also conceivable that single fibers 18, 20 or alternatively the large portion of the fibers 18, 20 completely penetrate the foam material component 14. It is moreover conceivable that single fibers 18, 20 or alternatively the large portion of the fibers 18, 20 extend into the foam material component 14 farther than by 50% of the maximum foam material thickness 22 of the foam material component 14, or that single fibers 18, 20 or alternatively the large portion of the fibers 18, 20 extend into the foam material component 14 by less than 50% of the maximum foam material thickness 22 of the foam material component 14. A proportion of the maximum foam material thickness 22 of the foam material component 14 to a maximum nonwoven fabric thickness 24 of the nonwoven fabric component 12 is herein at least greater than or equal to 1. It is however also conceivable that the textile composite material for lamination of a seat cover has a proportion of a maximum foam material thickness of the foam material component to a maximum nonwoven fabric thickness of the nonwoven fabric component which is at least smaller than or equal to 1.

The nonwoven fabric component 12 and the foam material component 14 are moreover needled with each other in such a way that a holding force between the nonwoven fabric component 12 and the foam material component 14 acting counter to a foam-nonwoven separating force is greater than 1 N. This is achieved by a needling process of the nonwoven fabric component 12 and the foam material component 14 in which the fibers 18, 20 of the nonwoven fabric component 12 are needled into the foam material component 14 by means of a needling machine (not shown in detail), resulting in the fibers 18, 20 of the nonwoven fabric component 12 establishing a form-fit and/or force-fit connection with the foam material component 14. The nonwoven fabric component 12 is thus connected to the foam material component 14 undetachably, i.e. permanently. The foam material component 14 herein has a volumetric weight which is greater than 10 kg per m³. The nonwoven fabric component 12 has a basis weight which is greater than 45 g per m².

The nonwoven fabric component 12 further comprises at least one functional fiber 26, which has a linear mass density value which is smaller than or equal to 50 dtex. The functional fiber 26 is herein embodied by one of the fibers 18, 20 of the nonwoven fabric component 12. The functional fiber 26 is embodied as a hollow fiber. Herein the functional fiber 26 may have any cross section deemed expedient by someone skilled in the art, e.g. a star-shaped cross section, a tetragonal cross section, a trilobal cross section, a horseshoe-shaped cross section, an annulus-shaped cross section, or the like. All in all, the nonwoven fabric component 12 comprises a plurality of functional fibers 26 which have a linear mass density value smaller than or equal to 50 dtex and which are in particular embodied as hollow fibers.

The nonwoven fabric component 12 furthermore comprises at least one binder fiber 38 (melt fiber). The binder fiber 38 is herein embodied by one of the fibers 18, 20 of the nonwoven fabric component 12. All in all, the nonwoven fabric component 12 comprises a plurality of binder fibers 38. Due to being mixed-up, the binder fibers 38 and/or the functional fibers 26 of the nonwoven fabric component 12 are interconnected via a form-fit connection (by interlacing), via cohesion and/or via adhesion. For the purpose of implementing the nonwoven fabric component 12, the binder fibers 38 and/or the functional fibers 26 may be arranged in an oriented manner or in a tangled manner.

The textile composite material for lamination of a seat cover 10 is embodied as a textile composite material for lamination of a seat cover of a seat cover. The textile composite material for lamination of a seat cover 10 is thus configured to at least partly implement a seat cover 30, in particular a motor vehicle seat cover. For this purpose the textile composite material for lamination of a seat cover 10 is connectable to at least one further material 32, e.g. a textile, a leather, a synthetic leather, or the like (FIGS. 2 and 3). The seat cover 30 may thus be configured to be at least partly implementable at least via a connection of the textile composite material for lamination 10 and the further material 32. In the exemplary embodiment shown in FIG. 2, the further material 32 is embodied as leather, which may be connected to the textile composite material for lamination of a seat cover 10 for implementing the seat cover 30. For this purpose the further material 32 is arrangeable on a side of the foam material component 14 facing away from the nonwoven fabric component 12. For connecting the textile composite material for lamination of a seat cover 10 and the further material 32, the textile composite material for lamination of a seat cover 10 or the seat cover 30 comprises at least one connection component 36. The connection component 36 is embodied as an adhesive component. It is herein conceivable that the connection component 36 is implemented as an adhesive non-woven/adhesive web, as a self-adhesive glue, in particular as a self-adhesive, pressure-sensitive glue, or the like. In an implementation of the connection component 36 as an adhesive non-woven/adhesive web, the connection component 36 has a reticulate structure and is in particular embodied of a material similar or identical to the binder fiber 38, wherein the connection component 36 has a melting point which is equivalent to a value of a value range from 50° C. to 140° C., preferably of a value range from 90° C. to 100° C.

In an alternative implementation of the further material 32 as a textile or as a synthetic leather, the connection component 36 is embodied at least partly in a one-part implementation with the foam material component 14, or the connection component 36 is embodied as an additional foam material component, wherein the connection component 36 is in both embodiments flame-laminatable. In an implementation of the connection component 36 as an additional foam material component, a lost-foam procedure, which is already known to someone skilled in the art, is advantageously applicable. Herein the connection component 36 is arrangeable on the foam material component 14 via flame lamination and the further material 32 is arrangeable on the connection component 36, which is already arranged on the foam material component 14, via flame lamination. Subsequently to the flame lamination, the connection component 36, which is embodied as an additional foam material component, is thus present just as a thin adhesive layer. Advantageously an original thickness of the textile composite material for lamination of a seat cover 10 can be at least substantially kept up. It is furthermore also conceivable that, alternatively or additionally, glue points and/or glue powder, meltprint procedures, hotmelt glues, adhesive foils or other adhesive-bonding measures or adhesive-bonding procedures, in particular hot-melt or cold-melt procedures, deemed expedient by someone skilled in the art, which advantageously maintain a textile character of the textile composite material for lamination of a seat cover 10, are used to connect the further material 32 to the foam material component 14.

The textile composite material for lamination of a seat cover 10 is connectable to the further material 32, for example, by means of a flatbed lamination plant or by means of a leather fixation plant. Herein a processing temperature for connecting the textile composite material for lamination of a seat cover 10 and the further material 32 may be kept advantageously low, in particular in an implementation of the connection component 36 as an adhesive non-woven/adhesive web.

In FIG. 3 the seat cover 30 comprises at least one reinforcing material 34, in addition to the textile composite material for lamination of a seat cover 10 and the further material 32. The reinforcing material 34 is herein configured for reinforcing the further material 32. In the exemplary embodiment of the textile composite material for lamination of a seat cover 10 shown in FIG. 3, the reinforcing material 34 is thus embodied as a leather reinforcing material. It is however also conceivable that the reinforcing material 34 features a different implementation deemed expedient by someone skilled in the art, in particular an implementation which depends on an implementation of the further material 32. The reinforcing material 34 is arranged between the textile composite material for lamination of a seat cover 10 and the further material 32. Herein the reinforcing material 34 is arranged on a side of the foam material component 14 which faces away from the nonwoven fabric component 12, in particular between the foam material component 14 and the connection component 36. It is however also conceivable that the reinforcing material 34 features a different arrangement, which is deemed expedient by someone skilled in the art. The reinforcing material 34 may be embodied as a textured material, as a warp-knitted material, as a knitted material, as a lattice, or the like, for supporting leather. Preferably the reinforcing material 34 can be fixated with the foam material component 14 by means of an adhesive web (not shown in detail). In this way a stretching of the leather in case of a load is advantageously at least substantially preventable or at least reducible. Moreover specially stressed areas of the seat cover 30, e.g. an outlet point of a lateral airbag, may be provided with appropriate reinforcements. Furthermore, by way of appropriate choice of the reinforcing material 34, at least a stretching characteristic, a material characteristic, in particular a maximum tensile force to be endured, etc., of the textile composite material for lamination of a seat cover 10, are specifically modifiable. In an alternative implementation of the further material 32 as a textile material or as a synthetic leather, which is not shown here in detail, it is also conceivable that, in addition to the connection component 36, a chemical binding agent (not shown here), e.g. a glue, is provided which is arrangeable on the further material 32 and/or on the textile composite material for lamination of a seat cover 10. Said binding agent may advantageously at least substantially avoid or at least reduce a fiber dust of fibers of the further material 32 and/or an adhesion of fiber material of the nonwoven fabric component 12 on the further material 32, in particular subsequently to a curing process of the binding agent. Advantageously a fluff protection is achievable.

The textile composite material for lamination of a seat cover 10 advantageously allows a smooth, fold-free arrangement of the textile composite material for lamination of a seat cover 10 even on difficult seat contours of a seat, in particular of a motor vehicle seat, e.g. on a convexly implemented cushioning of a seat, in a heavily strained region of a seat, e.g. a lateral wing of an access side of a seat, etc. Beyond this, the textile composite material for lamination of a seat cover 10 is advantageously highly drapeable in minute radii, e.g. in case the textile composite material for lamination of a seat cover 10 is arranged on a seat in which the textile composite material for lamination of a seat cover 10 is formed convex in a partial region of the textile composite material for lamination of a seat cover 10 and is formed concave in a further partial region of the textile composite material for lamination of a seat cover 10 which directly abuts the partial region. Furthermore the textile composite material for lamination of a seat cover 10 is difficult to ignite in accordance with FMVSS 302, or ISO 3795 respectively. Furthermore, all relevant documents of the automobile industry are taken into consideration, e.g. requirements regarding emission/fogging/smell, the end-of-life vehicle regulation, etc., etc.

Furthermore the textile composite material for lamination of a seat cover 10 comprises at least one counterfeit protection unit 28. Herein the counterfeit protection unit 28 is connected to the nonwoven fabric component 12 and/or to the foam material component 14 in an at least substantially non-releasable fashion. In an implementation of the counterfeit protection unit 28, the counterfeit protection unit 28 is embodied as an electronical counterfeit protection unit. Thus the counterfeit protection unit 28 may be embodied, for example, as an electronic product code unit (EPC unit) or may feature another implementation that is deemed expedient by someone skilled in the art. Alternatively or additionally, the counterfeit protection unit 28 is embodied as a mechanical counterfeit protection unit. In this case it is conceivable that a counterfeit protection element of the counterfeit protection unit 28, which is embodied as a differently-colored fiber (not shown here in detail), is incorporated into the counterfeit protection unit 28. Further implementations of the counterfeit protection unit 28 embodied as a mechanical counterfeit protection unit, which are deemed expedient by someone skilled in the art, are also conceivable.

The invention claimed is:

1. A textile composite material for lamination of a seat cover, comprising:
   a nonwoven fabric component;
   a foam material component which is connected to the nonwoven fabric component by needling, wherein the nonwoven fabric component comprises a plurality of binder fibers and a plurality of functional fibers; and
   a connection component to connect a further material to the textile composite material, wherein more than 15% of a total connecting surface of the foam material component is pierced by the plurality of binder fibers and the plurality of functional fibers of the nonwoven fabric component along a direction extending transversely to the connecting surface of the foam material component, and the plurality of binder fibers and the plurality of functional fibers of the nonwoven fabric component are distributed over the total connecting surface, the connecting surface of the foam material component is a total surface of the foam material component adjoining the nonwoven fabric component in a state when the foam material component is connected to the nonwoven fabric component by needling, a holding force between the nonwoven fabric component and the foam material component, which acts counter to a foam-nonwoven separating force, is greater than 1 N, the foam material component has a maximum foam material thickness between 1 mm to 6 mm, wherein the foam material component is a polyurethane-polyether foam or a polyurethane-polyester foam, the functional fibers of the plurality of functional fibers have a linear mass density value between 1.5 dtex and 24 dtex, wherein the binder fibers of the plurality of binder fibers have a linear mass density value between 1 dtex and 9 dtex, the functional fibers of the plurality of functional fibers are hollow fibers, more than 20% of a total number of fibers of the nonwoven fabric component entering into the foam material component extend into the foam material component by at least 50% of the maximum foam material thickness of the foam material component, single fibers of the plurality of binder fibers of the nonwoven fabric component completely penetrate the foam material component, the connection component is arranged on a side of the foam material component facing away from the nonwoven fabric component, the connection component is an adhesive nonwoven with a reticulate structure and the adhesive nonwoven is in direct contact with the side of the foam material component facing away from the nonwoven fabric component, and the single fibers of the plurality of binder fibers that completely penetrate the foam material component and thereby protrude from the foam material component on the side of the foam material component facing away from the nonwoven fabric component are connected to the connection component.

2. The textile composite material for lamination of a seat cover according to claim 1, wherein per 1 cm$^2$ of the connecting surface of the foam material component, 20 to 300 fibers of the plurality of binder fibers and the plurality of functional fibers of the nonwoven fabric component enter into the foam material component.

3. The textile composite material for lamination of a seat cover according to claim 1, wherein a proportion of the maximum foam material thickness of the foam material component to a maximum nonwoven fabric thickness of the nonwoven fabric component is greater than or equal to 1.

4. The textile composite material for lamination of a seat cover according to claim 1, wherein the foam material component has a volumetric weight which is greater than 10 kg per m$^3$.

5. The textile composite material for lamination of a seat cover according to claim 1, further comprising a counterfeit protection unit.

6. The textile composite material for lamination of a seat cover according to claim 5, wherein the counterfeit protection unit is connected to the nonwoven fabric component and/or to the foam material component at least substantially non-releasably.

7. The textile composite material for lamination of a seat cover according to claim 5, wherein the counterfeit protection unit is an electronical counterfeit protection unit.

8. The textile composite material for lamination of a seat cover according to claim 5, wherein the counterfeit protection unit is a mechanical counterfeit protection unit.

9. A seat cover, comprising
the textile composite material for lamination of a seat cover according to claim 1, and
a further material, wherein the further material is a textile, a leather or a synthetic leather,
the further material is connected to the textile composite material for lamination via the connection component of the textile composite material, and
the further material is arranged on the side of the foam material component of the textile composite material facing away from the nonwoven fabric component of the textile composite material.

10. The textile composite material for lamination of a seat cover according to claim 6, wherein the counterfeit protection unit is an electronical counterfeit protection unit.

11. The textile composite material for lamination of a seat cover according to claim 6, wherein the counterfeit protection unit is a mechanical counterfeit protection unit.

12. The textile composite material for lamination of a seat cover according to claim 1, wherein single fibers of the plurality of functional fibers of the nonwoven fabric component completely penetrate the foam material component.

13. The textile composite material for lamination of a seat cover according to claim 1, wherein the nonwoven fabric component has a basis weight which is smaller than 160 g per m$^2$.

14. A textile composite material for lamination of a seat cover, comprising:
a nonwoven fabric component;
a foam material component which is connected to the nonwoven fabric component by needling; and
a connection component to connect a further material to the textile composite material, wherein
the connection component is arranged on a side of the foam material component facing away from the nonwoven fabric component,
the nonwoven fabric component comprises a plurality of binder fibers and a plurality of functional fibers,
more than 15% of a total connecting surface of the foam material component is pierced by the plurality of binder fibers and the plurality of functional fibers of the nonwoven fabric component, wherein the plurality of binder fibers and the plurality of functional fibers of the nonwoven fabric component which pierce the connecting surface are distributed over a total connecting surface and along a direction extending transversely to the connecting surface of the foam material component,
the connecting surface of the foam material component is a total surface of the foam material component adjoining the nonwoven fabric component in a state when the foam material component is connected to the nonwoven fabric component by needling, a holding force between the nonwoven fabric component and the foam material component, which acts counter to a foam-nonwoven separating force, is greater than 1 N, the foam material component has a maximum foam material thickness between 1 mm to 6 mm, the foam material component is a polyurethane-polyether foam or as a polyurethane-polyester foam, the functional fibers of the plurality of functional fibers have a linear mass density value between 1.5 dtex and 24 dtex, the binder fibers of the plurality of binder fibers have a linear mass density value between 1 dtex and 9 dtex, the functional fibers of the plurality of functional fibers are hollow fibers, single fibers of the plurality of binder fibers of the nonwoven fabric component completely penetrate the foam material component, the single fibers of the plurality of binder fibers which completely penetrate the foam material component protrude from the foam material component on the side of the foam material component facing away from the nonwoven fabric component subsequent to the needling, the connection component is an adhesive nonwoven with a reticulate structure and the adhesive nonwoven is in direct contact with the side of the foam material component facing away from the nonwoven fabric component, the single fibers of the plurality of binder fibers which completely penetrate the foam material component and thereby protrude from the foam material component on the side of the foam material component facing away from the nonwoven fabric component are connected to the connection component, the connection component has a melting point between 50° C. and 140° C., and each hollow fiber of the plurality of functional fibers has a hollow-space portion of more than 5% and less than 15%, with respect to a total volume portion of each hollow fiber.

* * * * *